United States Patent
Kim et al.

(10) Patent No.: US 11,568,648 B2
(45) Date of Patent: Jan. 31, 2023

(54) APPARATUS FOR REAL-TIME MONITORING FOR CONSTRUCTION OBJECT AND MONITORING METHOD AND COMPUTER PROGRAM FOR THE SAME

(71) Applicant: UIF (University Industry Foundation), Yonsei University, Seoul (KR)

(72) Inventors: Hyoung Kwan Kim, Seoul (KR); Seong Deok Bang, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 135 days.

(21) Appl. No.: 17/132,598

(22) Filed: Dec. 23, 2020

(65) Prior Publication Data

US 2021/0192225 A1 Jun. 24, 2021

(30) Foreign Application Priority Data

Dec. 24, 2019 (KR) .......................... 10-2019-0173757

(51) Int. Cl.
*G06V 20/52* (2022.01)
*G06T 7/11* (2017.01)
(Continued)

(52) U.S. Cl.
CPC ........... *G06V 20/52* (2022.01); *G06K 9/6215* (2013.01); *G06K 9/6256* (2013.01); *G06N 3/04* (2013.01);
(Continued)

(58) Field of Classification Search
CPC ........... H04N 7/18; H04N 7/185; G06N 3/08; G06N 3/0445; G06N 3/0454; G06N 3/04;
(Continued)

(56) References Cited

FOREIGN PATENT DOCUMENTS

| KR | 10-1548639 | 9/2015 |
|---|---|---|
| KR | 10-1656642 | 9/2016 |

(Continued)

OTHER PUBLICATIONS

Yang Z, Yuan Y, Zhang M, Zhao X, Zhang Y, Tian B. Safety distance identification for crane drivers based on mask R-CNN. Sensors. Jun. 21, 2019;19(12):2789. (Year: 2019).*

(Continued)

*Primary Examiner* — Vu Le
*Assistant Examiner* — Tracy Mangialaschi
(74) *Attorney, Agent, or Firm* — Lex IP Meister, PLLC (57) ABSTRACT

Disclosed herein is an apparatus for the real-time monitoring of construction objects. The apparatus for the real-time monitoring of construction objects includes: a communication unit configured to receive image data acquired by photographing a construction site, and to transmit safety information to an external device; and a monitoring unit provided with a prediction model pre-trained using binary image sequences of construction objects at the construction site as training data, and configured to detect a plurality of construction objects from image frames included in image data received via the communication unit and convert the detected construction objects into binary images, to generate future frames by inputting the resulting binary images to the prediction model, and to derive proximity between the construction objects by comparing the generated future frames with the resulting binary images and generate the safety information.

3 Claims, 5 Drawing Sheets

DETECT A PLURALITY OF CONSTRUCTION OBJECTS IN IMAGE FRAMES AND COVERT THE DETECTED CONSTRUCTION OBJECTS INTO BINARY IMAGES — S100

GENERATE FUTURE FRAMES BY INPUTTING THE BINARY IMAGES TO A PREDICTION MODEL — S200

DERIVE PROXIMITY BY COMPARING THE FUTURE FRAMES WITH THE BINARY IMAGES — S300

GENERATE SAFETY INFORMATION USING THE DERIVED PROXIMITY — S400

(51) Int. Cl.
　　*G06T 7/00*　　　(2017.01)
　　*G06T 7/73*　　　(2017.01)
　　*G06N 3/08*　　　(2006.01)
　　*G06K 9/62*　　　(2022.01)
　　*G06T 7/136*　　　(2017.01)
　　*G06N 3/04*　　　(2006.01)
　　*H04N 7/18*　　　(2006.01)
　　*G06V 20/13*　　　(2022.01)

(52) U.S. Cl.
　　CPC .............. *G06N 3/08* (2013.01); *G06T 7/0002* (2013.01); *G06T 7/11* (2017.01); *G06T 7/136* (2017.01); *G06T 7/74* (2017.01); *G06V 20/13* (2022.01); *H04N 7/18* (2013.01); *G06T 2207/10032* (2013.01); *G06T 2207/20081* (2013.01); *G06T 2207/20084* (2013.01); *G06T 2207/20164* (2013.01); *G06T 2207/30232* (2013.01)

(58) Field of Classification Search
　　CPC .. G06N 3/088; G06T 7/11; G06T 7/20; G06T 7/74; G06T 7/136; G06T 7/0002; G06T 2207/30232; G06T 2207/20084; G06T 2207/20164; G06T 2207/10032; G06T 2207/30184; G06T 2207/20081; G06V 10/751; G06V 10/462; G06V 20/13; G06V 20/52; G06V 20/17; G06K 9/6256; G06K 9/6215

See application file for complete search history.

(56) References Cited

FOREIGN PATENT DOCUMENTS

| KR | 1656642 B1 * | 9/2016 | ............ G06Q 50/10 |
|---|---|---|---|
| KR | 10-2018-0045745 | 5/2018 | |
| KR | 10-2019-0072077 | 6/2019 | |
| KR | 2019072077 A * | 6/2019 | ............ B60W 30/08 |

OTHER PUBLICATIONS

Fang, Weili, et al. "Automated detection of workers and heavy equipment on construction sites: A convolutional neural network approach." Advanced Engineering Informatics 37 (2018): 139-149. (Year: 2018).*

KIPO, Office Action of Application No. 10-2019-0173757, dated Jan. 16, 2022.

Lee Min Hye et al., "Crack Detection on the Road in Aerial Image using Mask R-CNN", Journal of the Korea Industrial Information Systems Research vol. 24 No. 3, Jun. 2019 : Jun. 23-29, 2019.

* cited by examiner

| WORKER | CURRENT PROXIMITY BETWEEN THE WORKER AND THE EXCAVATOR(m) | FUTURE PROXIMITY BETWEEN THE WORKER AND THE EXCAVATOR(m) | FUTURE ANGLE BETWEEN THE EXCAVATOR AND THE WORKER(°) | SPEED OF THE EXACTOR APPROACHING THE WORKER(m/s) |
|---|---|---|---|---|
| 1 | 2.68 | 2.73 | 343.1 | -0.05 |
| 2 | 4.18 | 2.23 | 225.00 | 1.95 |
| 3 | 5.14 | 2.98 | 120.96 | 2.16 |
| 4 | 3.86 | 1.76 | 236.82 | 2.10 |

CURRENT PROXIMITY     FUTURE PROXIMITY

APPARATUS FOR REAL-TIME MONITORING FOR CONSTRUCTION OBJECT AND MONITORING METHOD AND COMPUTER PROGRAM FOR THE SAME

CROSS-REFERENCE TO RELATED APPLICATION

This application claims the benefit of Korean Patent Application No. 10-2019-0173757 filed on Dec. 24, 2019, which is hereby incorporated by reference herein in its entirety.

BACKGROUND

1. Technical Field

The present invention relates to an apparatus and method for the real-time monitoring of construction objects, which are capable of maximizing the amount of safety information by utilizing the sensing capability of a drone and contributing to the actual reduction of safety-related accidents, and also relates to a computer program for executing the same.

2. Description of the Related Art

With the recent development of various unmanned aerial vehicles (UAVs) such as drones, it has become possible to efficiently collect the image information of a large area. Unmanned aerial vehicles equipped with cameras are considerably useful tools for monitoring because they can collect images efficiently unlike closed-circuit television (CCTV) cameras.

Research into the use of these drones for construction site management is actively being conducted. Currently, although there are many studies that attempt to prevent collision accidents by monitoring the proximity between construction objects from images photographed by drones, there are not many studies that predict the future movement of construction objects and generate preemptive safety accident prevention information. Furthermore, a study on measuring proximity using object segmentation to take into consideration the sizes and shapes of construction objects has not been conducted.

PRIOR ART DOCUMENTS

Patent Documents (Patent document 1) Korean Patent Application Publication No. 10-2016-0034013 (published on Mar. 29, 2016)
(Patent document 2) Korean Patent No. 10-1996371 (published on Jul. 3, 2019)

SUMMARY

An object of the present invention is to provide an apparatus and method for the real-time monitoring of construction objects, which are capable of maximizing the amount of safety information by utilizing the sensing capability of a drone and contributing to the actual reduction of safety-related accidents and also provide a computer program for executing the same.

According to an aspect of the present invention, there is provided an apparatus for the real-time monitoring of construction objects, the apparatus including: a communication unit configured to receive image data acquired by photographing a construction site, and to transmit safety information to an external device; and a monitoring unit provided with a prediction model pre-trained using binary image sequences of construction objects at the construction site as training data, and configured to detect a plurality of construction objects from image frames included in image data received via the communication unit and convert the detected construction objects into binary images, to generate future frames by inputting the resulting binary images to the prediction model, and to derive proximity between the construction objects by comparing the generated future frames with the resulting binary images and generate the safety information.

In the apparatus for the real-time monitoring of construction objects, the monitoring unit may include: an object segmentation module configured to detect a plurality of construction objects from the image frames included in the received image data and generate a number of binary images equal to a number of construction objects, wherein each of the binary images includes a single construction object; a future frame prediction module configured to generate the future frames by using binary image sequences, in each of which a plurality of binary images including the same construction object and selected from among the plurality of binary images generated by the object segmentation module are arranged in chronological order, as input values of the prediction model; and a proximity monitoring module configured to derive proximity between the construction objects by comparing each of the future frames generated by the future frame prediction module with at least any one binary image of a corresponding one of the binary image sequences arranged in chronological order and then generate the safety information.

In the apparatus for the real-time monitoring of construction objects, the object segmentation module may include Mask R-CNN, which is a machine learning model pre-trained using construction objects at the construction site as training data, and may detect a plurality of construction objects from the image frames included in the received image data by using the Mask R-CNN.

In the apparatus for the real-time monitoring of construction objects, the future frame prediction module may include a convolutional LSTM network, which is a prediction model pre-trained using the binary image sequences of the construction objects at the construction site.

In the apparatus for the real-time monitoring of construction objects, the proximity monitoring module may include: a corner detection unit configured to detect corners of the construction object included in the binary image; and a proximity measurement unit configured to calculate proximity information using a minimum distance between the construction objects based on the detected corners.

According to another aspect of the present invention, there is provided a method for the real-time monitoring of construction objects, the method being performed by a monitoring unit including a prediction model pre-trained using binary image sequences of construction objects at a construction site as training data, the method including: a first step of detecting a plurality of construction objects from image frames included in image data acquired by photographing a construction site and received via a communication unit and converting the detected construction objects into binary images; a second step of generating future frames by inputting the resulting binary images to the prediction model; a third step of deriving the proximity between the construction object by comparing the generated future frames with the resulting binary images; and a fourth step of generating safety information using the derived proximity.

In the method for the real-time monitoring of construction objects, the first step may include detecting a plurality of construction objects from the image frames included in the received image data and generating a number of binary images equal to the number of construction objects, in which case each of the binary images includes a single construction object; the second step may include generating the future frames by using binary image sequences, in each of which a plurality of binary images including a same construction object and selected from among the plurality of binary images generated by the object segmentation module are arranged in chronological order, as input values of the prediction model; the third step may include deriving the proximity between the construction objects by comparing each of the future frames generated by the future frame prediction module with at least any one binary image of a corresponding one of the binary image sequences arranged in chronological order; and the fourth step may be performed by comparing proximity at a current point in time with the proximity derived at the third step.

In the method for the real-time monitoring of construction objects, the first step may include detecting a plurality of construction objects from image frames included in the received image data by using Mask R-CNN, the prediction model of the second step may include a convolutional LSTM network, and the third step may use a Harris corner detection algorithm designed to detect corners of the construction object included in the binary image, and may include calculating straight line distances from all corner points of any one construction object to all corner points of another construction object and determining a shortest minimum one of the calculated straight line distances to be the proximity between the two construction objects.

The present invention may be implemented as a computer program stored in a computer-readable storage medium in order to execute the method for the real-time monitoring of construction objects according to the present invention in conjunction with hardware.

Other specific details of embodiments according to various aspects of the present invention are included in the following detailed description.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

The present invention may be subject to various modifications, and may have various embodiments. Specific embodiments will be illustrated and described in detail in the detailed description. However, it is to be understood that this is not intended to limit the present invention to the specific embodiments but is intended to include all modifications, equivalents, and substitutes included in the spirit and scope of the present invention.

The terms used in the present invention are used merely to describe specific embodiments, and are not intended to limit the present invention. Singular expressions include plural expressions unless the context clearly indicates otherwise. It is to be understood that in the present invention, terms such as "comprise" and "have" are intended to specify the presence of one or more features, numbers, steps, actions, components, or parts described in the specification, or a combination thereof, but do not preclude the possibility of the presence or addition of one or more other features, numbers, steps, actions, components, or parts, or a combination thereof. An apparatus and method for the real-time monitoring of construction objects according to embodiments of the present invention will be described below with reference to the drawings.

Figure 1:
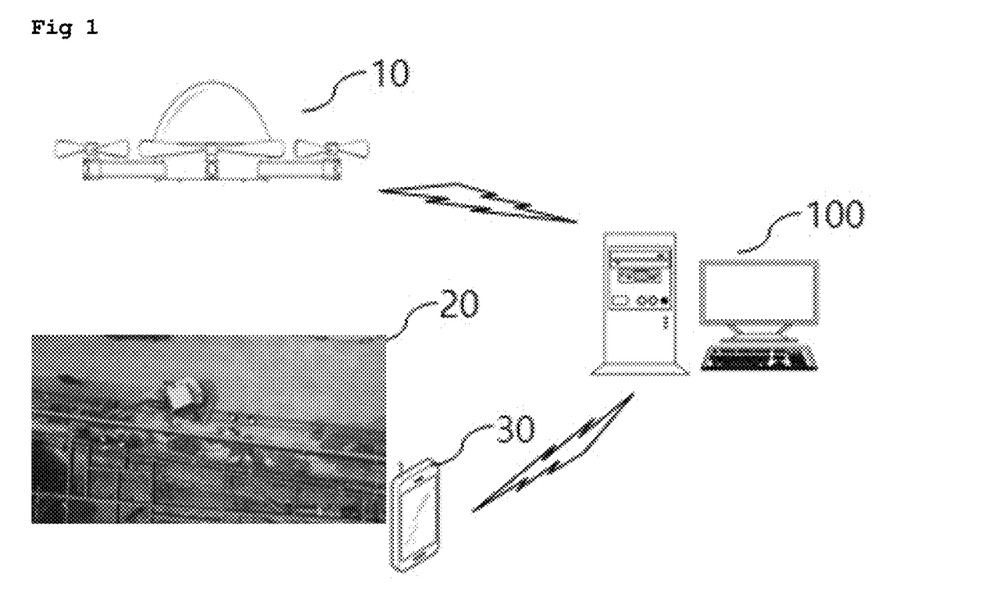
FIG. 1 is a diagram showing a system for the real-time monitoring of construction objects including an apparatus for the real-time monitoring of construction objects according to an embodiment of the present invention.

FIG. 1 is a diagram showing a system for the real-time monitoring of construction objects including an apparatus for the real-time monitoring of construction objects according to an embodiment of the present invention.

As shown in FIG. 1, in the system for the real-time monitoring of construction objects according to the present embodiment, when a construction site 20 is photographed with a drone 10 in real time and the image data acquired via the drone 10 is transmitted to an apparatus 100 for the real-time monitoring of construction objects (hereinafter referred to as the "monitoring apparatus 100") in real time, the monitoring apparatus 100 detects construction objects from the image data, generates predicted future values (future frames) after a few seconds to tens of seconds by inputting images related to the detected construction objects to a pre-trained prediction model, derives the proximity between the construction objects by comparing the future frames with the input images related to the construction objects, and transmits safety information, indicating whether there is a risk based on the proximity, to a worker terminal 30. The worker terminal 30 may be a mobile terminal carried by a worker at the construction site or by the driver of equipment (an excavator, a truck, or the like) used at the construction site.

Through this process, a collision accident at a construction site may be prevented by notifying a worker (a construction worker or an equipment operator) of the risk of collision inflicted by a construction object (an excavator, a truck, or the like) on another construction object (a worker, or the like) at the construction site.

Figure 2:
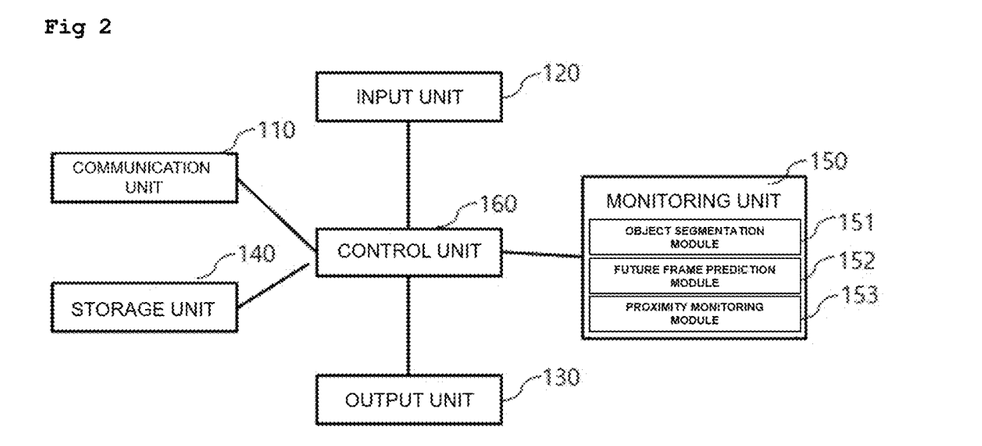
FIG. 2 is a diagram showing the configuration of an apparatus for the real-time monitoring of construction objects according to an embodiment of the present invention.

The monitoring apparatus 100 according to an embodiment of the present invention will be described with reference to FIG. 2. FIG. 2 is a diagram showing the configuration of the monitoring apparatus 100 according to the present embodiment.

As shown in FIG. 2, the monitoring apparatus 100 according to the present embodiment may include a communication unit 110, an input unit 120, an output unit 130, a storage unit 140, a monitoring unit 150, and a control unit 160.

The communication unit 110 performs the function of transmitting and receiving data over a communication network. The communication unit 110 receives image data transmitted from the drone 10. In addition, the communication unit 110 transmits safety information, indicating whether there is a risk, to the worker terminal 30.

The input unit 120 receives various information such as number and character information, and transfers signals, input in connection with the setting of various functions and the control the functions of the monitoring apparatus 100, to the control unit 160.

The output unit 130 may output a user interface corresponding to a user input. The output unit 130 may display a menu of the monitoring apparatus 100 and user data input by a user. When the output unit 130 is constructed in the form of a touch screen, the output unit 130 may perform some or all of the functions of the input unit 120.

The storage unit 140 is a device for storing data, includes a main memory device and an auxiliary memory device, and may store an application program required for functional operation of the monitoring apparatus 100. The storage unit 140 may store various types of machine learning models and algorithms required for the performance of functions.

The monitoring unit 150 includes a prediction model pre-trained using binary image sequences of construction objects at a construction site, detects a plurality of construction objects in image frames included in image data received through the communication unit 110 and converts them into binary images, generates future frames by inputting the binary images to the prediction model, and derives the proximity between the construction objects by comparing the future frames with the binary images, thereby generating safety information. The monitoring unit 150 will be described later with reference to FIGS. 3 to 6.

The control unit 160 performs control so that all the operations of the monitoring apparatus 100 will be processed. In other words, the control unit 150 controls each of the operations of the input unit 120, the output unit 130, the communication unit 110, the storage unit 140, and the monitoring unit 150.

Figure 3:
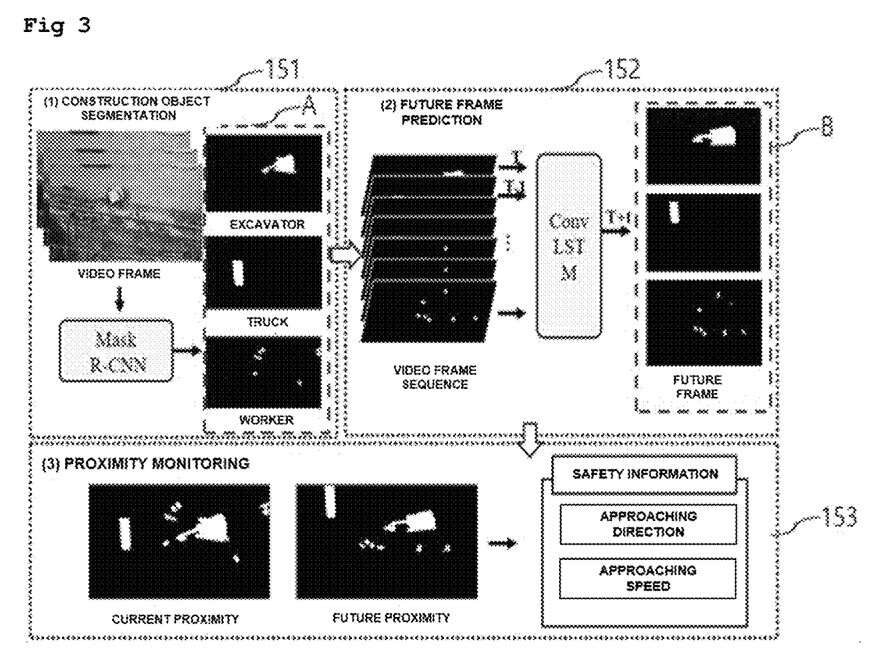
FIG. 3 is a diagram showing the monitoring unit of an apparatus for the real-time monitoring of construction objects according to an embodiment of the present invention.
Figure 4:
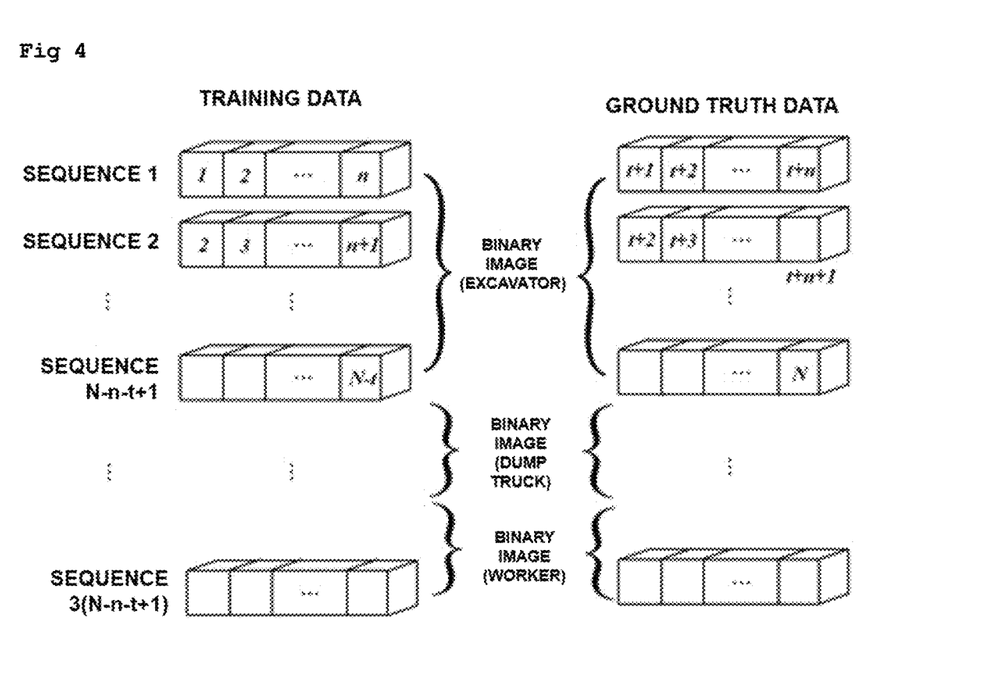
FIG. 4 is a diagram illustrating a method of generating training data for the learning of a prediction model according to an embodiment of the present invention.
Figure 5:
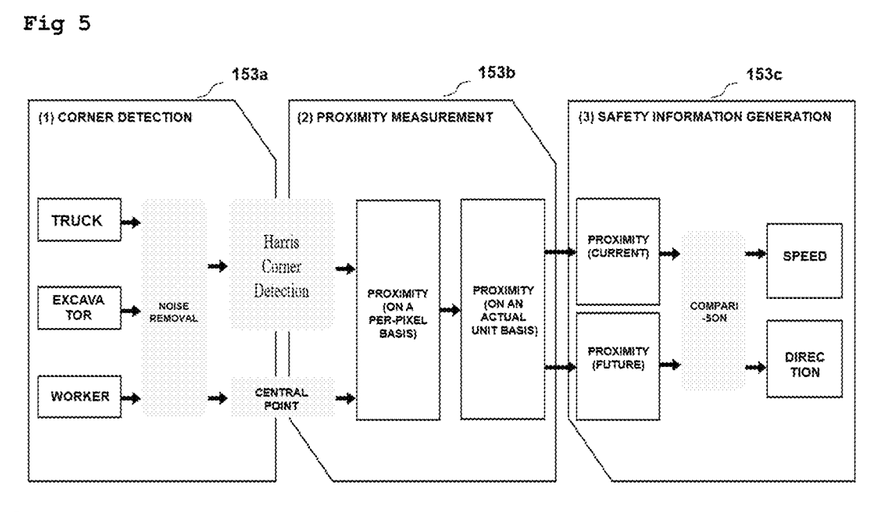
FIG. 5 is a diagram illustrating the process of calculating proximity and then generating safety information in a proximity monitoring module according to an embodiment of the present invention.
Figure 6:
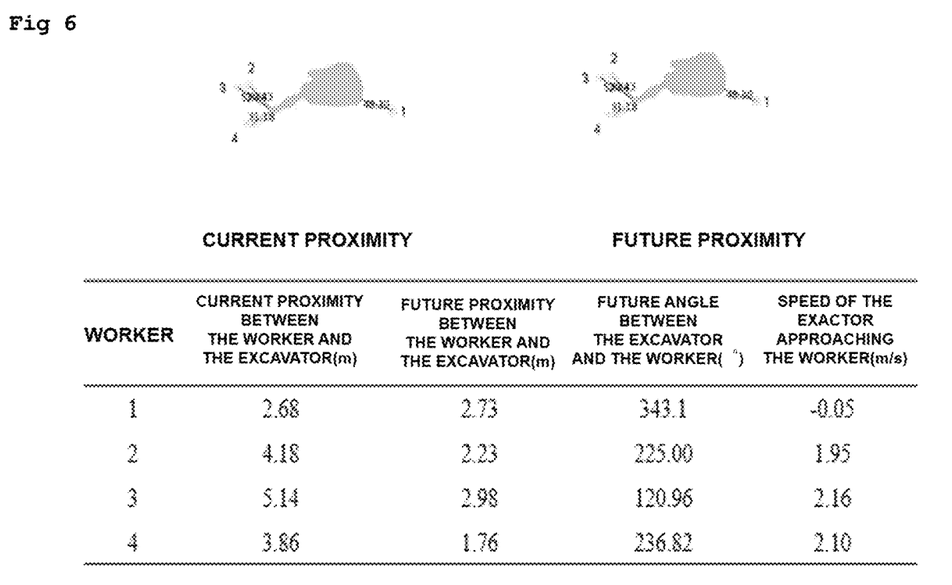
FIG. 6 is a view illustrating an example of safety information generated by an apparatus for the real-time monitoring of construction objects according to an embodiment of the present invention.

The monitoring unit 150 is now described with reference to FIGS. 3 to 6. FIG. 3 is a diagram showing the monitoring unit 150 of a monitoring apparatus 100 according to an embodiment of the present invention, FIG. 4 is a diagram illustrating a method of generating training data for the learning of a prediction model according to an embodiment of the present invention, FIG. 5 is a diagram illustrating the process of calculating proximity and then generating safety information in a proximity monitoring module according to an embodiment of the present invention, and FIG. 6 is a view illustrating an example of safety information generated by a monitoring apparatus 100 according to an embodiment of the present invention.

As shown in FIG. 3, the monitoring unit 150 includes an object segmentation module 151, a future frame prediction module 152, and a proximity monitoring module 153.

The object segmentation module 151 detects a plurality of construction objects from image frames included in image data acquired by photographing a construction site and received through the communication unit 110. In this case, the construction objects are all construction resources input to the construction site, and include construction equipment such as an excavator, a truck, a bulldozer, a crane, and a forklift, and one or more workers present at the construction site.

The object segmentation module 151 detects construction objects included in the image frames on a per-pixel basis by using a machine learning model pre-trained using construction objects at a construction site as training data, and generates a number of binary images equal to the number of detected construction objects. For example, when the construction objects included in the image frames are an excavator, a truck, and a worker, the object segmentation module 151 separates the three construction objects to generate separate image frames, and converts the image frames, including the respective construction objects, into three binary images by processing the construction objects into "1" and the background of the construction site into "0" (see FIG. 3A).

It is preferable that the pre-trained machine learning model used in the object segmentation module 151 be Mask R-Convolutional Neural Network (CNN). Mask R-CNN is a conceptually simple, flexible, and general object classification framework. Mask R-CNN efficiently detects an object in an image while generating a high-performance classification mask for each object. Mask R-CNN is an extension to Faster R-CNN, and provides a branch for the prediction of object masks in parallel in addition to an existing branch for recognition through a box.

Mask R-CNN receives consecutive image frames, and recognizes construction objects in individual frames on a per-pixel basis. Conventional vision-based safety evaluation studies have measured the distance between construction objects using object detection based on bounding boxes. They regard the locations of the construction objects as points and calculate the distance between the central points of bounding boxes where the objects were detected as the shortest distance between the objects. Meanwhile, a collision accident occurs due to a collision at an end of an object rather than the center thereof. For example, although the swing of the arm of an excavator may directly cause a collision, it is not taken into consideration in the conventional methods of measuring the proximity between the centers of objects. In order to measure the proximity between objects more accurately, the present invention recognizes construction objects based on object segmentation. Accordingly, the present invention makes it possible to measure the shortest distance between construction objects while taking into consideration the sizes and shapes of the construction objects.

The future frame prediction module 152 includes a prediction model pre-trained using binary image sequences of construction objects as training data. The future frame prediction module 152 generates future frames of binary images including the position and posture of the construction objects after several seconds to tens of seconds by using binary image sequences, in each of which a plurality of binary images including the same construction object and selected from among the plurality of binary images generated by the object segmentation module 151 are arranged in chronological order, as input values of the prediction model.

In this case, the prediction model may use Convolutional Long Short-Term Memory (ConvLSTM), which is a type of deep learning.

A method of constructing a pre-trained prediction model will be described with reference to FIG. 4. FIG. 4 is a diagram illustrating a method of generating training data for the learning of ConvLSTM, which shows the process of generating training data of ConvLSTM, which is a set of sequences consisting of image frames (video frames) from image data (video) of a construction site acquired by a drone.

Each sequence refers to a unit within which a network understands the pattern of changes of a construction object, and consists of n consecutive binary images. The binary images are the results obtained by recognizing the worker, the excavator, or the dump truck from the image frames via the object segmentation module 151. In order to train the network to predict a frame after point t, a new sequence consisting of images after point t for each image is used as the label of a sequence consisting of n consecutive binary images. In this manner, training data and labels are generated using the binary images acquired by recognizing the three types of construction objects. Accordingly, when the total number of video frames is N, the total number of sequences is 3*(N−n−t+1). In this case, 3 refers to the number of construction objects, and is only an example. When m is the number of construction objects at the construction site, the total number of sequences is m*(N−n−t+1). The training data and the labels thereof are 5-dimensional tensors having dimensions such as the number of sequences, the number of frames per sequence, the width of each image, the height of each image, and the channel of each image. ConvLSTM relies on unsupervised learning, which does not require separate labeling because it generates learning sequences and the labels thereof from the same video frames.

When a ConvLSTM network is designed, it should be noted that a kernel size needs to be larger than the pixel to which a specific object moves per time unit in input images. The reason for this is that due to the nature of a convolution operation, when the quantity of changes of a specific object is larger than the kernel size, relevant information cannot be obtained from the previous cell. For example, if the construction equipment of a (t−1)-th frame in the video moves to a pixel value larger than the kernel size in a t-th frame, there is no basis for correlating information on the same construction equipment in the t-th frame with information in the (t−1)-th frame. Several studies attempted the stacking of ConvLSTM layers to overcome the limitation on setting a kernel size. In this context, it is necessary to develop a new network having the number of layers and kernel size optimized for target performance. Since the number of image pixels to which an object moves per one time unit may vary according to the situation of the construction site and the characteristics of the object, a network representing this situation needs to be designed. Table 1 shows 16 network candidates according to four convolution filter sizes and four ConvLSTM layers. 16 models having different numbers of layers and different filter sizes were selected as candidate architectures for future frame prediction for construction video.

TABLE 1

| Number of ConvLSTM layers | Network structure |
| --- | --- |
| 1 | N(3), N(5), N(7), N(9) |
| 2 | N(3)-N(3), N(5)-N(5), N(7)-N(7), N(9)-N(9) |
| 3 | N(3)-N(3)-N(3), N(5)-N(5)-N(5), N(7)-N(7)-N(7), N(9)-N(9)-N(9) |
| 4 | N(3)-N(3)-N(3)-N(3), N(5)-N(5)-N(5)-N(5), N(7)-N(7)-N(7)-N(7), N(9)-N(9)-N(9)-N(9) |

ConvLSTM having a filter size of $N(n) = n \times n$

FIG. 3B illustrates a future frame of the excavator, a future frame of the truck and a future frame of the worker after t seconds generated by inputting the excavator image sequence, the truck image sequence, and the worker image sequence, generated by the object segmentation module 151, to the pre-trained ConvLSTM. The generated future frames are in the form of binary images.

The proximity monitoring module 153 derives the proximity between construction objects by comparing each of the future frames generated by the future frame prediction module 152 with at least any one binary image of a corresponding one of the binary image sequences (i.e., the image sequences input to the prediction model) arranged in chronological order. In this case, it is preferable that the binary image compared with the future frames for the derivation of the proximity be the most recent one of the binary images constituting the binary image sequences. In addition, the proximity monitoring module 153 generates safety information providing notification of the risk of collision between the construction objects using the derived proximity.

The process of calculating proximity and generating safety information will be described with reference to FIG. 5. FIG. 5 is a diagram illustrating the process of calculating proximity and generating safety information in the proximity monitoring module 153 according to an embodiment of the present invention.

As shown in FIG. 5, the proximity monitoring module 153 includes a corner detection unit 153a, a proximity measurement unit 153b, and a safety information generation unit 153c.

In the binary images of the construction objects generated by the object segmentation module 151, the construction object corresponding to the construction equipment may be recognized as a polygonal shape. In order to measure the shortest distance between multiple polygonal construction objects, the corner detection unit 153a detects the corners of each construction object included in the future frame and the binary image to be compared with the future frame (hereinafter referred to as the "comparative binary image"). The corner detection unit 153a includes a Harris corner detection algorithm, and detects the vertices of each polygon based on the Harris corner detection algorithm. The worker at the construction site, which is one of the construction objects, is relatively small compared to the construction equipment, and thus, for the convenience of calculation, the corners are not detected and the worker is regarded as a point.

Meanwhile, since the future frame generated by the future frame prediction module 152 may include pixels irrelevant to the construction objects, the corner detection unit 153a removes noise by applying a Gaussian filter to the input images (the future frame and the comparative binary image). Depending on the relative size of the construction object, the size of the Gaussian filter to be applied may vary. For example, since the size of the worker is relatively small compared to that of the construction equipment, a Gaussian filter of sizes 3,3 is applied to a binary image acquired by recognizing the worker, and a Gaussian filter of size 7,7 is applied to images of the truck and the excavator, which are construction equipment.

After the noise has been removed, changes in pixel intensity are measured while a window is moved in all directions. The Harris corner detection algorithm determines a point where changes in pixel intensity in all directions are large as a corner. In the present invention, since an input image input to the Harris corner detection algorithm is processed as a binary image composed of values of 0 and 1, all points where changes occur regardless of the values and directions of the changes in pixel intensity may be regarded as corners of a polygon.

Since projection distortion occurs in the process of mapping an actual 3D construction site to a 2D image frame (video frame) via a camera mounted on a drone, it is desirable to minimize projection distortion by performing orthographic projection during an image data acquisition process. This scheme is disadvantageous in that the height information of a construction object is lost due to orthogonal projection, but can measure the displacements in the x and y axes excluding the displacement in the z axis. In the present invention, the proximity is calculated by using the displacements in the x and y axes between two construction objects, excluding the heights, measured from the 2D image data.

The proximity measurement unit 153b calculates the proximity between the construction objects based on the future positions and postures of the construction objects in a pair of result images of the corner detection unit 153a. The result images are images including the corners detected in future frames and the corners detected in comparative binary images. The proximity measurement unit 153b calculates the linear distances from all corner points of one construction object to all corner points of another construction object, and determines the smallest minimum one of them to be the proximity between the two construction objects. In this case, in order to reduce computational complexity, the worker at the construction site having a relatively small size is regarded as a point. In other words, for the worker, a central point is calculated without the application of corner detection, and the calculated central point is used to determine the proximity. In order to measure actual proximity, the proximity measurement unit 153b utilizes a reference construction object whose size is known.

The per-pixel proximity is extracted by measuring the proximity between the construction objects using the pair of result images as described above, and the actual size proximity is calculated by scaling the per-pixel proximity to an actual size using Equation 1 below:

$$\text{Proximity}_{actual} = \text{scale} * \text{proximity}_{image}$$
$$(\text{scale} = \text{proximity}_{actual}/\text{Proximity}_{image}) \quad (1)$$

The safety information generation unit 153c generates intuitive safety information for the effective transmission of predicted future proximity to the worker. The safety information generation unit 153c calculates the direction and speed in and at which the other construction object approaches the worker so that the worker can intuitively understand them by comparing proximity information at a current point in time with proximity information at a future point in time calculated by the proximity measurement unit 153b using the future frame predicted by the future frame prediction module 152.

The proximity information at the current point in time is obtained as a result of performing corner detection and proximity measurement using the positions and postures of the construction objects determined via the object segmentation module 151 from image frames included in current image data transmitted from the drone 10. In other words, the proximity information at the current point in time is calculated by sequentially inputting binary images having passed through the object segmentation module 151 to the corner detection unit 153a and the proximity measurement unit 153b, and the proximity information in the future point in time is calculated by sequentially inputting binary images having passed through the object segmentation module 151 and the future frame prediction module 152 to the corner detection unit 153a and the proximity measurement unit 153b.

The direction and the speed in and at which the other construction object approaches the worker may be calculated using the differences in time and proximity between the current frame having not passed through the future frame prediction module 152 and the future frame having passed through the future frame prediction module 152 and the angle between two points corresponding to the minimum distance, as shown in Equations 2 and 3:

$$\text{Speed} = \frac{\text{Proximity}_{future} - \text{Proximity}_{current}}{t} \quad (2)$$

$$\text{Heading direction} = \arctan\left(\frac{\text{Proximity}_{future}(y)}{\text{Proximity}_{future}(x)}\right) \quad (3)$$

FIG. 6 is a view showing an example of safety information generated by an apparatus for the real-time monitoring of construction objects according to an embodiment of the present invention. The left view of FIG. 6 shows current proximity information, the right view of FIG. 6 shows future proximity information, and the table shown in the lower part of FIG. 6 shows the current proximity, future proximity, approach speed, and angle between each worker and an excavator.

According to the table of FIG. 6, worker 1 may be estimated as being in a safe state because the excavator is farther away from worker 1, and worker 3 and work 4 may be estimated as being in a risky state because the speed at which the excavator approaches is high. Worker 2 may be estimated as being in a semi-risky state because worker 2 is closer to the excavator than workers 3 and 4, but the relative approach speed of the excavator for worker 2 is smaller than for workers 3 and 4. Whether a state in question is risky (semi-risky) or safe may be determined by taking into consideration the minimum distance (future proximity) and approach speed between the worker and the construction object, i.e., construction equipment, in an integrated manner. These criteria may be set by taking into consideration the specificity of a construction site during design.

Figure 7:
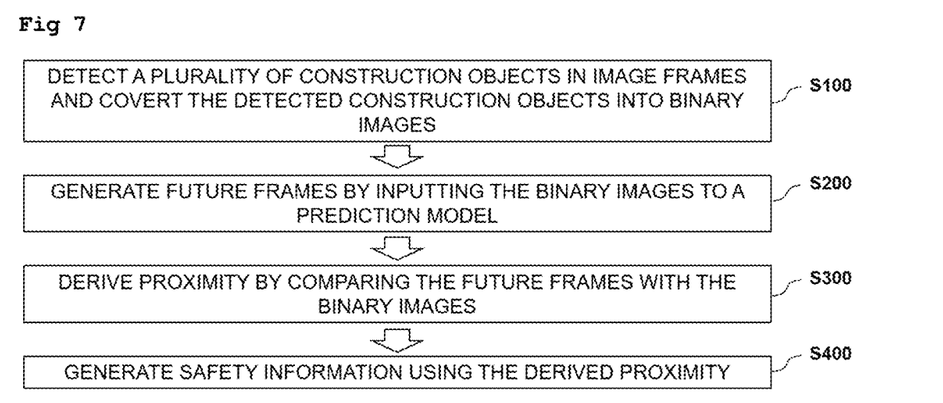
FIG. 7 is a flowchart showing a method for the real-time monitoring of construction objects according to an embodiment of the present invention.

Next, a method for the real-time monitoring of construction objects according to an embodiment of the present invention will be described with reference to FIG. 7. FIG. 7 is a flowchart showing the method for the real-time monitoring of construction objects according to the present embodiment.

As shown in FIG. 7, the method for the real-time monitoring of construction objects according to the present embodiment is performed by the monitoring unit 150 having a prediction model pre-trained using binary image sequences of construction objects at a construction site as training data, and includes: a first step S100 of detecting a plurality of construction objects in image frames included in the image data acquired by photographing a construction site and received through the communication unit 110 and converting the detected construction objects into binary images, a second step S200 of generating future frames by inputting the resulting binary images to the prediction model, a third step S300 of deriving proximity between construction objects by comparing the generated future frames and the resulting binary images, and a fourth step S400 of generating safety information using the derived proximity.

At the first step S100, a plurality of construction objects are detected from the image frames included in the received image data, and there are generated a number of binary images equal to the number of detected construction objects. In this case, each of the binary images is made to contain a single construction object. At the first step S100, the plurality of construction objects are detected from the image frames, included in the received image data, by using a Mask R-CNN.

At the second step S200, future frames are generated by using binary image sequences, in each of which a plurality of binary images including the same construction object and selected from among the plurality of generated binary images are arranged in chronological order, as input values of the prediction model. The prediction model includes a convolutional LSTM Network.

At the third step S300, the proximity between the construction objects is derived by comparing each of the future frames generated at the second step S200 with at least any one binary image of a corresponding one of the binary image sequences arranged in chronological order. At the third step S300, a Harris corner detection algorithm for detecting corners of a construction object included in a binary image is used, the linear distances from all corner points of one construction object to all corner points of another construction object are calculated, and the smallest minimum distance is determined to be the proximity between the two construction objects.

The fourth step S400 is performed by comparing the proximity at a current point in time with the proximity derived at the third step S300. The proximity information at the current point in time is obtained as a result of corner detection and proximity measurement using the positions and postures of the construction objects determined from image frames included in current image data transmitted from the drone 10. In other words, the proximity information at the current point in time is calculated by applying the binary images having passed through the first step S100 to the third step S300, and the proximity information at the future point in time is calculated by applying binary images having passed through the first and second steps S100 and S200 to the third step S300.

Figure 8:
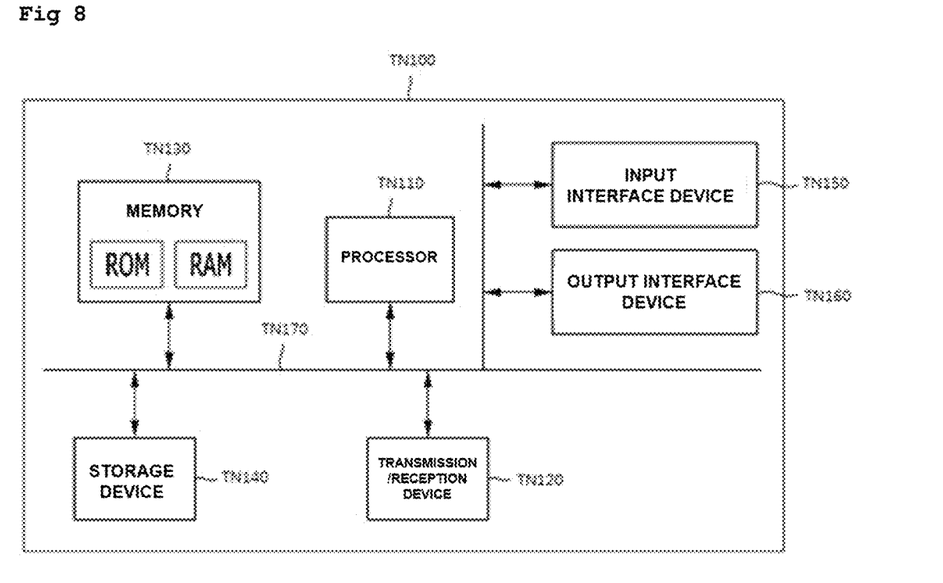
FIG. 8 is a diagram showing a computing device according to an embodiment of the present invention.

FIG. 8 is a diagram showing a computing device according to an embodiment of the present invention. The computing device TN100 of FIG. 8 may be the apparatus for the real-time monitoring of construction objects described herein.

In the embodiment of FIG. 8, the computing device TN100 may include at least one processor TN110, a transmission/reception device TN120, and memory TN130. In addition, the computing device TN100 may further include a storage device TN140, an input interface device TN150, an output interface device TN160, and the like. The components included in the computing device TN100 may be connected by a bus TN170 and communicate with each other.

The processor TN110 may execute program instructions stored in at least one of the memory TN130 and the storage device TN140. The processor TN110 may refer to a central processing unit (CPU), a graphics processing unit (GPU), or a dedicated processor in which methods according to embodiments of the present invention are performed. The processor TN110 may be configured to implement procedures, functions, and methods described in connection with embodiments of the present invention. The processor TN110 may control the individual components of the computing device TN100.

Each of the memory TN130 and the storage device TN140 may store various types of information related to the operations of the processor TN110. Each of the memory TN130 and the storage device TN140 may be implemented as at least one of a volatile storage medium and a nonvolatile storage medium. For example, the memory TN130 may be implemented as at least one of read-only memory (ROM) and random access memory (RAM).

The transmission/reception device TN120 may transmit or receive wired signals or wireless signals. The transmission/reception device TN120 may be connected to a network and perform communication.

Meanwhile, the present invention may be implemented as a computer program. The present invention may be implemented as a computer program stored in a computer-readable storage medium in order to perform the method for the real-time monitoring of construction objects according to the present invention in combination with hardware.

The methods according to the embodiments of the present invention may be implemented in the form of programs that can be read through various computer means, and may be recorded on a computer-readable storage medium. In this case, the recording storage may include program instructions, data files, data structures, etc. alone or in combination.

The program instructions recorded on the storage medium may be specially designed and constructed for the present invention, or may be known to and usable by those skilled in the field of computer software.

For example, the storage medium includes magnetic media such as a hard disk, a floppy disk and a magnetic tape, optical media such as CDROM and a DVD, magnetic-optical media such as a floptical disk, and hardware devices specially configured to store and execute program instructions such as ROM, RAM, flash memory, and the like.

Examples of program instructions may include not only a machine language such as that produced by a compiler but also a high-level language that can be executed by a computer using an interpreter or the like.

Such a hardware device may be configured to operate as one or more software modules to perform the operation of the present invention, and vice versa.

Next, there will be described the results of the verification of the performance of the object segmentation module 151, the future frame prediction module 152, and the proximity monitoring module 153 constituting the monitoring unit 150 of the apparatus for the real-time monitoring of construction objects according to the embodiment of the present invention.

1. Object Segmentation Module

To verify the performance of the object segmentation module, 1180 frames were extracted from drone image data acquired by photographing a construction site. The coordinates of the construction site were manually annotated at a pixel level using a VGG image annotator.

To evaluate the performance of Mask R-CNN, 860 images out of 1180 images were used as a training data set, and the remaining 320 images were used as a validation data set.

Table 2 shows average precision (AP), mean average precision (mAP), and average IoU for each class of object segmentation. IoU is a metric that quantifies a percent overlap between a reference mask and a prediction mask, and represents object recognition accuracy on a per-pixel basis.

TABLE 2

| Average precision | | | | |
|---|---|---|---|---|
| Excavator | Dump truck | Worker | mAP | IoU |
| 99.77% | 95.05% | 89.88% | 94.32% | 85.79% |

The average IoU is the average of the IoU values obtained from all detection results of the test dataset. Average precision represents a change in recognition performance according to an IoU value in the form of one value. In this specification, in the same manner as in a method of evaluating precision in the object segmentation field of the COCO (Common Objects in Context) challenge, the precision was calculated in the IoU threshold range of 0.5 to 0.95. As to mAP, when there are multiple object classes, the average of the APs for each of the classes is calculated and network performance is expressed as a single metric. The experimental results prove that Mask R-CNN recognizes construction objects with sufficient accuracy.

2. Future Frame Prediction Module

To verify the performance of the future frame prediction module, 760 consecutive image frames were extracted from a total of nine pieces of image data on a per-second basis. The 760 image frames are completely independent of the 1180 images described above. Through the trained Mask R-CNN, 760 image frames generated 2,280 binary images acquired by recognizing three objects from each of the image frames. Among them, 694 image frames (2082 binary images) extracted from seven pieces of image data were used as training data, and 66 image frames (198 binary images) extracted from two pieces of image data were used as test data.

In the present specification, one piece of data may be defined as a set of sequences generated from image frames extracted from one piece of image data. In this case, each of the sequences may consist of five consecutive binary images. However, since the network has only seven pieces of training data, it is difficult to say that it includes the context of various patterns of construction objects. In this specification, the leave-one-out cross-validation method (LOOCV) was used to find the optimized number of stacks and filters of ConvLSTM using a relatively small amount of data. In this method, a number of models equal to the number of samples are constructed, and, when each model is trained, only one sample is excluded and performance is measured using the one excluded sample and averaged. Since the leave-one-out cross-validation method tests all samples once, it can neither completely exclude randomness nor overcome the overfitting of a model that is biased in a specific dataset.

Among the 16 model candidates in Table 1, the number of stacks and filters of ConvLSTM having the highest average performance were selected. The performance of each model was evaluated using F-measure, which is the harmonized average of recall and precision. Recall is an indicator obtained by dividing the number of pixels of the predicted mask correctly predicted by the number of pixels of the reference mask, and precision is obtained by dividing the number of pixels of the predicted mask correctly predicted by the number of pixels of the predicted mask.

Table 3 shows the results, obtained by performing LOOCV on 16 network candidates, with F-measure. This proves that one ConvLSTM with 9×9 filters is a model optimized for this dataset. Based on the selected model, the performance of this methodology was tested using two pieces of test data. The ConvLSTM network predicted recall and precision for one future frame with a pixel-level accuracy of 81.24% and a pixel-level accuracy of 79.95%, respectively.

TABLE 3

| | | Number of stacks | | | |
|---|---|---|---|---|---|
| | | 1 | 2 | 3 | 4 |
| Filter size | 3 × 3 | 80.06% | 79.80% | 80.25% | 80.20% |
| | 5 × 5 | 80.72% | 81.36% | 81.29% | 80.94% |
| | 7 × 7 | 81.69% | 81.53% | 80.96% | 81.10% |
| | 9 × 9 | 82.00% | 81.71% | 80.98% | 81.21% |

3. Proximity Monitoring Module

To verify the proximity monitoring module, the error between the actual distance between objects and the predicted distance between objects was measured. The calculated proximity on a per-pixel basis was converted into proximity on an actual metric basis based on Equation 1. The actual length of the reference object in Equation 1 was 5.205 m, the size of the pixels occupied in the image was 92 pixels, and the scene scale was calculated to be about 0.05658 m/pixel.

Based on this, the average proximity error was measured for 66 test frames. Table 4 shows the average error of proximity according to the time-step of the future frame prediction module. The proximity information of the current frames and the proximity information of the future frames may be compared utilizing Equation 2, and preemptive safety information such as heading speed and heading direction may be provided.

TABLE 4

| | | Pixel error (pixel) | Actual error (m) |
|---|---|---|---|
| Time-step of frame prediction (s) | 1 | 7.54 | 0.43 |
| | 2 | 16.11 | 0.91 |
| | 3 | 21.61 | 1.22 |

Although there are many studies on preventing collision accidents by monitoring the proximity between construction objects from images, there are not many studies on generating preemptive safety accident prevention information by predicting the future movement of construction objects. In addition, studies on measuring the proximity utilizing object segmentation to take into consideration the sizes and shapes of construction objects have not been conducted.

The apparatus and method for the real-time monitoring of construction objects according to the embodiment of the present invention are new methods different from conventional image-based safety management methods, and can maximize the amount of safety information by utilizing the sensing capability of a drone and contribute to the actual reduction of safety-related accidents.

While the embodiments of the present invention have been described above, it will be apparent to those of ordinary skill in the art that the present invention may be modified or altered in various manners through the addition, changing, or deletion of a component, or the like without departing from the spirit of the present invention described in the claims. Such modifications and alterations are also included in the scope of the present invention.

What is claimed is:

1. An apparatus for real-time monitoring of construction objects, the apparatus comprising:
    a transmission/reception device configured to receive image data acquired by photographing a construction site, and to transmit safety information to an external device; and
    at least one processor provided with a prediction model pre-trained using binary image sequences of construction objects at the construction site as training data, and configured to
        detect a plurality of construction objects from image frames included in image data received via the transmission/reception device,
        generate a number of binary images equal to a number of the detected construction objects, wherein each of the binary images includes a single construction object,
        generate future frames including positions and postures of the detected construction objects after several seconds to tens of seconds, by using binary image sequences, in each of which a plurality of binary images including a same construction object and selected from among the generated binary images are arranged in chronological order, as input values of the prediction model, and
        derive proximity between the detected construction objects by comparing each of the generated future frames with at least one binary image of a corresponding one of the binary image sequences arranged in chronological order and then generate the safety information,
    wherein the at least one processor is configured to
        detect corner points of each of the detected construction objects by recognizing the detected construction objects as polygonal shapes,
        calculate straight line distances from the corner points of a first construction object to the corner points of a second construction object among the detected construction objects, and
        determine a shortest minimum one of the calculated straight line distances as the proximity between the first construction object and the second construction object.

2. The apparatus of claim 1, wherein the at least one processor comprises Mask R-CNN, which is a machine learning model pre-trained using construction objects at the construction site as training data, and detects the plurality of construction objects from the image frames included in the received image data by using the Mask R-CNN.

3. The apparatus of claim 1, wherein the at least one processor comprises a convolutional LSTM network, which is a prediction model pre-trained using the binary image sequences of the construction objects at the construction site.

* * * * *